(12) United States Patent
Lee et al.

(10) Patent No.: US 9,256,309 B2
(45) Date of Patent: Feb. 9, 2016

(54) DISPLAY DEVICE INCLUDING INTEGRATED TOUCH PANEL

(71) Applicant: LG Display Co., Ltd., Seoul (KR)

(72) Inventors: So-Hyung Lee, Goyang-si (KR); Jun-Seok Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 187 days.

(21) Appl. No.: 13/855,237

(22) Filed: Apr. 2, 2013

(65) Prior Publication Data

US 2014/0132526 A1    May 15, 2014

(30) Foreign Application Priority Data

Nov. 13, 2012  (KR) .................. 10-2012-0127998

(51) Int. Cl.
*G06F 3/044*   (2006.01)
*G06F 3/041*   (2006.01)

(52) U.S. Cl.
CPC .............. *G06F 3/0412* (2013.01); *G06F 3/044* (2013.01)

(58) Field of Classification Search
USPC ................ 345/173–178; 178/18.01–20.01
See application file for complete search history.

(56) References Cited

U.S. PATENT DOCUMENTS

| 6,075,520 | A  | * | 6/2000  | Inoue et al.    | 345/173   |
| 2009/0025987 | A1 | * | 1/2009  | Perski et al.   | 178/18.03 |
| 2009/0066670 | A1 | * | 3/2009  | Hotelling et al.| 345/174   |
| 2009/0244021 | A1 | * | 10/2009 | Matsuo et al.   | 345/173   |
| 2009/0267916 | A1 | * | 10/2009 | Hotelling       | 345/174   |
| 2010/0144391 | A1 | * | 6/2010  | Chang et al.    | 455/566   |
| 2010/0182275 | A1 | * | 7/2010  | Saitou          | 345/174   |
| 2012/0075220 | A1 | * | 3/2012  | Matsui et al.   | 345/173   |
| 2013/0076648 | A1 | * | 3/2013  | Krah et al.     | 345/173   |

FOREIGN PATENT DOCUMENTS

| KR | 10-2011-0091809 | 8/2011 |
| KR | 10-2012-0097765 | 9/2012 |
| TW | 200739401 A | 10/2007 |

(Continued)

OTHER PUBLICATIONS

Office Action for Taiwanese Patent Application No. 10212007, Jun. 18, 2015, 14 Pages.

(Continued)

*Primary Examiner* — Quan-Zhen Wang
*Assistant Examiner* — Chad Dicke
(74) *Attorney, Agent, or Firm* — Fenwick & West LLP

(57) ABSTRACT

A display device comprises a touch panel including a plurality of electrode columns that each includes a plurality of electrodes positioned in the electrode column. The display device further comprises a plurality of lines, each of which is connected to a corresponding electrode included in a corresponding one of the plurality of electrode columns. The lengths of the lines within a first electrode column increase as the lines are positioned further from one end of the first electrode column that is not adjacent to the second electrode column in a direction substantially perpendicular to a longitudinal direction of the lines of the first electrode column and the lengths of the lines within a second electrode column decrease as the lines are positioned further from the one end of the first electrode column in the direction substantially perpendicular to a longitudinal direction of the lines of the second electrode column.

8 Claims, 3 Drawing Sheets

(56) References Cited

FOREIGN PATENT DOCUMENTS

| | | |
|---|---|---|
| TW | 200943160 A | 10/2009 |
| TW | 201214239 A | 4/2012 |

OTHER PUBLICATIONS

Korean Office Action, Korean Application No. 10-2012-0127998, Nov. 20, 2015, 5 pages (with concise explanation of relevance).

\* cited by examiner

DISPLAY DEVICE INCLUDING INTEGRATED TOUCH PANEL

CROSS-REFERENCE TO RELATED APPLICATION(S)

This application claims the benefit under 35 U.S.C. §119 (a) of Korean Patent Application No. 10-2012-0127998, filed on Nov. 13, 2012, in the Korean Intellectual Property Office, the entire disclosure of which is incorporated by reference herein for all purposes.

BACKGROUND

1. Technical Field

The following description relates to a display device, and more particularly, to a display device including an integrated touch panel.

2. Discussion of the Related Art

A touch panel is a kind of input device that is installed in an image display device, such as a liquid crystal display (LCD), a field emission display (FED), a plasma display panel (PDP), an electroluminescence device (EL), an eletrophoretic display (EPD), etc., to allow a user to input predetermined information by pressing (or touching) a touch sensor in the touch screen while viewing the image display device.

Recently, in order to implement a slim mobile terminal, such as a smart phone, a tablet PC, or the like, demands are increasing for an in-cell type display device including an integrated touch panel where elements configuring the touch panel are installed.

Hereinafter, a driving of an in-cell type display device including an integrated touch panel will be described with reference to FIG. 1.

FIG. 1 is a view showing a display device including an integrated touch panel according to the related art. Specifically, FIG. 1 shows an in-cell self-capacitive type display device including an integrated touch panel.

In FIG. 1, an in-cell self-capacitive type display device including an integrated touch panel according to the related art includes a panel 10 where a plurality of electrodes 11 and a plurality of lines (not shown) connected to the plurality of electrodes 11, respectively, are formed, and a display drive integrated circuit (IC) 20.

For example, the display drive IC 20 may transmit a change in capacitance due to a touch input applied to the plurality of electrodes 11 of the panel 10 to a touch IC (not shown).

In the panel 10, a parasitic capacitance is generated between the plurality of electrodes 11 and the plurality of lines. As a distance from the display drive IC 20 to the electrodes 11 increases, an overlapping area of the plurality of electrodes 11 and the plurality of lines increases. Accordingly, as the distance from the display drive IC 20 to the electrodes 11 increases, the parasitic capacitance of the plurality of electrodes 11 increases.

The deviation in parasitic capacitance may cause reduction in sensing accuracy and reliability of a touch sensing method using a differential self sensing unit (DSSU).

SUMMARY

Embodiments of the present invention relate to a display device including an integrated touch panel. Accordingly, embodiments of the present invention are directed to a display device that substantially obviates one or more of the problems due to limitations and disadvantages of the related art.

An object of embodiments is to provide a display device including an integrated touch panel where touch sensing accuracy and reliability are improved.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a display device comprising: a touch panel including a plurality of electrode columns, each electrode column including a plurality of electrodes positioned in the electrode column, the plurality of electrode columns including at least a first electrode column and a second electrode column that are adjacent to each other; a plurality of lines, each line connected to a corresponding electrode included in a corresponding one of the plurality of electrode columns; a display driving integrated circuit (IC) connected to the plurality of lines, the display driving IC for applying a touch scan signal to the plurality of electrodes of one or more electrode columns; and a touch IC for receiving a plurality of touch sense signals that are generated based on the touch scan signal from the plurality of electrodes; wherein lengths of the lines within the first electrode column increase as the lines within the first electrode column are positioned further from one end of the first electrode column that is not adjacent to the second electrode column in a direction substantially perpendicular to a longitudinal direction of the lines of the first electrode column; wherein lengths of the lines within the second electrode column decrease as the lines within the second electrode column are positioned further from the one end of the first electrode column in a direction substantially perpendicular to a longitudinal direction of the lines of the second electrode column; wherein the touch IC determines a touch input based on the touch sense signals received from at least two adjacent electrodes in one of the electrode columns.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

DETAILED DESCRIPTION

Figure 1:
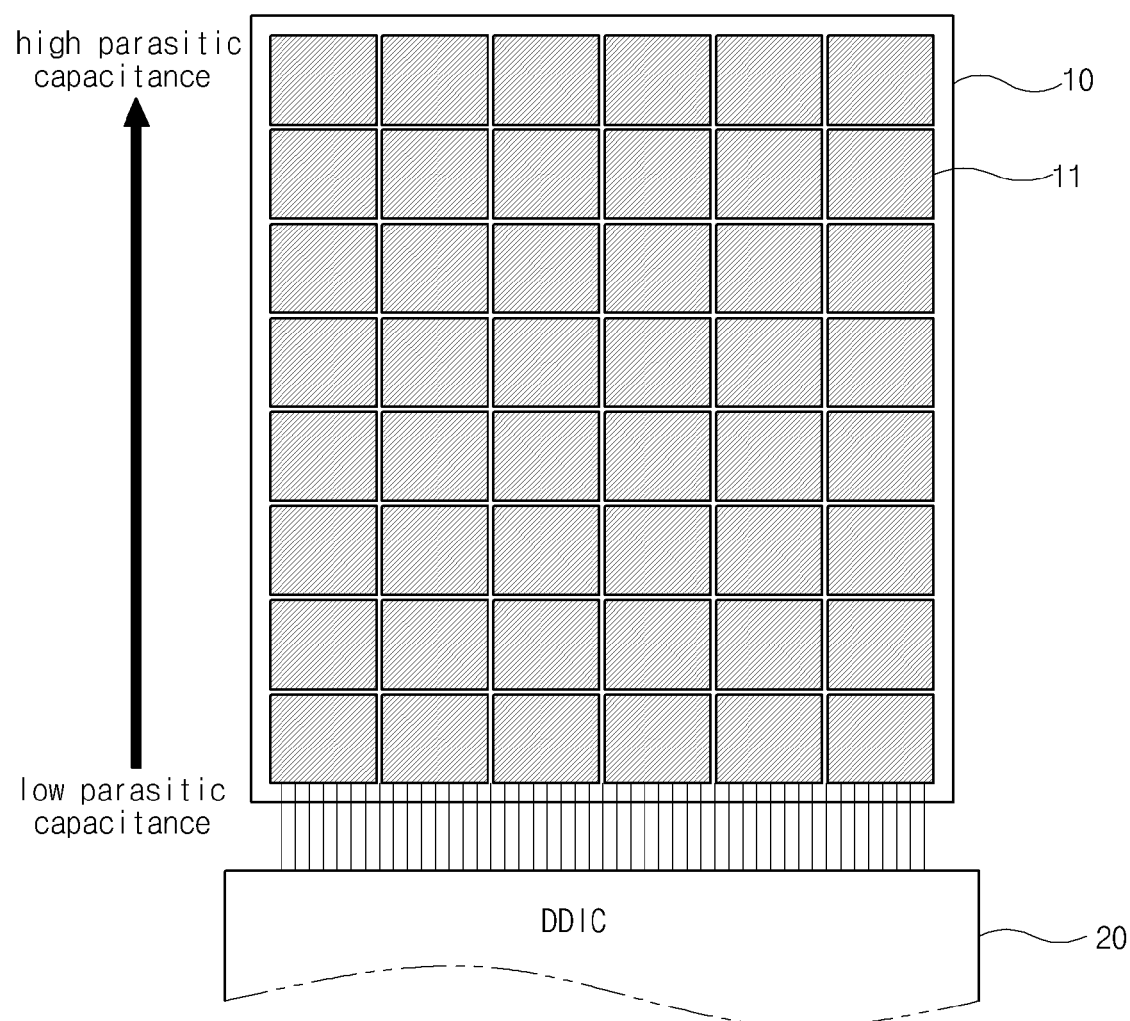
FIG. 1 illustrates a display device including an integrated touch panel according to the related art.

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2:
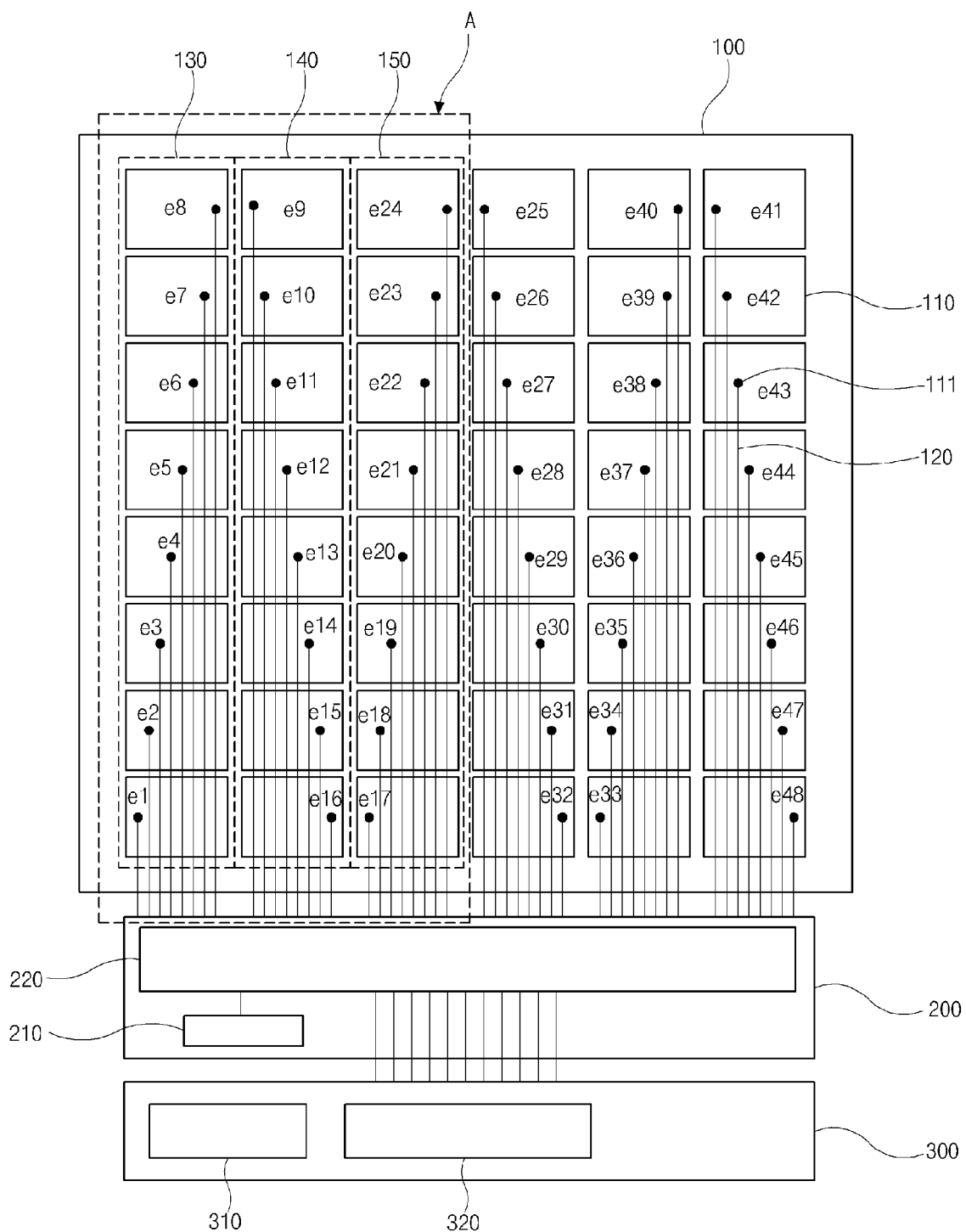
FIG. 2 illustrates a display device including an integrated touch panel according to one embodiment.

FIG. 2 is a view showing a display device including an integrated touch panel according to one embodiment.

In FIG. 2, a display device including an integrated touch panel may include a panel 100, a display drive integrated circuit (IC) 200 and a touch IC 300.

The panel 100 may have a touch panel (not shown) installed therein, and the touch panel may function to detect a touch position by a user. As an example, the touch panel may have an in-cell self-capacitive type.

The panel 100 may have a structure where a liquid crystal layer is formed between two substrates. For example, a plurality of gate lines, a plurality of data lines crossing the plurality of gate lines, and a plurality of thin film transistors (TFTs) connected to the plurality of gate lines and the plurality of data lines may be formed on a lower substrate of the panel 100. A plurality of pixels may be arranged in a matrix form by the crossing of the plurality of gate lines and the plurality of data lines.

In addition, the panel 100 may include a plurality of lines 120 and a plurality of electrodes 110. In one embodiment, each electrode 110 includes a contact hole 111.

The plurality of electrodes 110 function as a common electrode which drives a liquid crystal layer with a pixel electrode in each pixel when a common voltage is applied to the plurality of electrodes 110 for displaying an image and also function as a touch electrode which senses a touch position when a touch scan signal is applied to the plurality of electrodes 110 for sensing a touch.

For example, the display device including an integrated touch panel may be driven by a time division method where one frame is divided into a display driving period and a touch driving period. When the panel 100 has a display driving mode, the display drive IC 200 applies the common voltage to the plurality of electrodes 110 and the plurality of electrodes 110 function as the common electrode for displaying an image with the pixel electrode. When the panel 100 has a touch driving mode, the touch IC 300 applies a touch scan signal to the plurality of electrodes 110 and the plurality of electrodes 110 function as the touch electrode for sensing a touch position.

For example, the touch scan signal may be applied to the plurality of electrodes 110 through the display drive IC 200.

The plurality of electrodes 110 constitute a plurality of electrode columns in the panel 100. For example, the plurality of electrodes 110 may be grouped into the plurality of electrode columns such as a first electrode column 130, a second electrode column 140, and a third electrode column 150. Each of the plurality of electrode columns may be disposed along a direction parallel to the plurality of lines 120. As shown in FIG. 2, each electrode 110 included in an electrode column is vertically arranged in the electrode column in a direction parallel to the plurality of lines 120 and is vertically adjacent to at least one other electrode included in the column. For example, in the first electrode column 130, electrode e1 is vertically adjacent to electrode e2 which is vertically adjacent to both electrode e3 and electrode e1.

Although all of the plurality of electrodes 110 are grouped into the plurality of electrode columns parallel to the plurality of lines 120 in the display device including an integrated touch panel according to an embodiment of the present invention, FIG. 2 shows the first, second and third electrode columns 130, 140 and 150 for convenience of illustration.

The contact hole 111 for connecting the plurality of electrodes 110 and the plurality of lines 120, respectively, is formed in each of the plurality of electrodes 110. The contact holes 111 of the plurality of electrodes 110 are symmetrically disposed in the adjacent electrode columns.

For example, the contact holes 111 of the first electrode column 130 may be disposed from left to right with respect to a horizontal direction in electrodes e1 to e8. For example, the contact hole in electrode e2 is positioned farther from the left edge of electrode e2 than the position of the contact hole in electrode e1 from the left edge of electrode e1. Similarly, the contact hole in electrode e3 is positioned farther from the left edge of electrode e3 than the position of the contact hole in electrode e2 from the left edge of electrode e2, and so on. Also, as shown in FIG. 2, each contact hole 111 corresponding to each electrode e1 to e8 of the first electrode column 130 is vertically positioned in a corresponding electrode at a substantially equal horizontal distance from the position of a contact hole 111 included in a vertically adjacent electrode. In one embodiment, each contact hole 111 corresponding to each electrode e1 to e8 of the first electrode column 130 is vertically positioned in the center of a corresponding electrode as shown in FIG. 2. Similar to the position of the contact holes 111 of the first electrode column 130, the contact holes 111 of the second electrode column 140 may be disposed from left to right with respect to the horizontal direction in electrodes e9 to e16. Each contact hole 111 of each electrode e9 to e16 of the second electrode column 140 is also vertically positioned in the center of a corresponding electrode.

As shown in FIG. 2, the contact holes 111 of the electrodes 110 in the second electrode column 140 are positioned at a vertical position opposite to the position of the contact holes 111 of the electrodes 110 in the first electrode column 130. That is, the position of the contact hole 111 of each corresponding electrode in the second electrode column 140 from the right edge of the electrode is substantially equal to the position of a contact hole 111 from the left edge of its corresponding electrode from the first electrode column 130 that is horizontally adjacent to the electrode from the second electrode column 140. For example, the position of the contact hole in electrode e9 from the right edge of electrode e9 included in the second electrode column 130 is substantially equal to the position of the contact hole in electrode e8 from the left edge of electrode e8 included in the first electrode column 130. Similarly, the position of the contact hole in electrode e10 from the right edge of electrode e10 included in the second electrode column 130 is substantially equal to the position of the contact hole in electrode e7 from the left edge of electrode e7 included in the first electrode column 130 and so on. Also, similar to the electrodes of the first electrode column 130, each contact hole 111 corresponding to each electrode e9 to e16 of the second electrode column 130 is vertically positioned in a corresponding electrode at a substantially equal horizontal distance from the position of contact hole 111 included in a vertically adjacent electrode. As a result, the contact holes 111 of the first electrode column 130 and the contact holes 111 of the second electrode column 140 are symmetrically disposed with respect to each other. In addition, the position of the contact holes 111 of the first electrode column 130 may be disposed to have a slope in the first electrode column 130, and the position of the contact holes 111 of the second electrode column 140 may be disposed to have a slope in the second electrode column 140. The slope in each electrode column refers to the slope of the position of the contact holes in each electrode column.

Further, the contact holes 111 of the third electrode column 150 may be disposed from left to right with respect to the horizontal direction in electrodes e17 to e24 similar to the position of the contact holes 111 of the first electrode column 130, and may be symmetrically disposed with respect to the contact holes 111 of a fourth electrode column to the right of the third electrode column 150.

Accordingly, electrodes e1 to e48 may be connected to the display drive IC 200 sequentially from left to right due to disposition of the contact holes 111.

Here, each of the plurality of electrodes 110 may correspond to a plurality of contact holes 111. Although one contact hole 111 is formed in each of the plurality of electrodes 110 of the display device according to one embodiment, multiple contact holes may be formed in each of the plurality of electrodes 110 to prevent deterioration such as electric separation between the electrode and the line or breakdown of the contact hole due to an external static electricity or a defective process.

The plurality of lines 120 connect the contact holes 111 of the plurality of electrodes 110 and the display drive IC 200 and are symmetrically disposed in the adjacent electrode columns.

For example, the plurality of lines 120 connected to the contact holes 111 of electrodes e1 to e8 of the first electrode column 130 may be sequentially disposed from left to right, and the plurality of lines 120 connected to the contact holes 111 of electrodes e9 to e16 of the second electrode column 140 adjacent to the first electrode column 130 may be sequentially disposed from left to right.

In addition, the plurality of lines 120 connected to the contact holes 111 of electrodes e17 to e24 of the third electrode column 150 may be sequentially disposed from left to right and may be symmetrically disposed with the plurality of lines 120 connected to the contact holes 111 of the adjacent second electrode column 140.

Accordingly, electrodes e1 to e48 may be connected to the display drive IC 200 sequentially from left to right due to the disposition of the plurality of lines 120.

The display drive IC 200 may include a common voltage generating unit 210 for applying the common voltage to the plurality of electrodes 110 and a switching unit 220 for applying the common voltage and the touch scan signal to the plurality of electrodes 110 according to a driving mode of the panel 100. The common voltage or the touch scan signal is applied to the plurality of electrodes 110 through the contact hole 111 and the plurality of lines 120.

In addition, the display drive IC 200 of the display device according to one embodiment may include a gate driving unit (not shown), a data driving unit (not shown) for applying a data signal (RGB) to the plurality of data lines on the lower substrate of the panel 100 and a timing controlling unit (not shown) for controlling the gate driving unit and the data driving unit.

The common voltage generating unit 210 generates the common voltage which is supplied to the plurality of electrodes 110 for displaying an image when the panel 100 is operated in a display driving mode. The common voltage generated by the common voltage generating unit 210 is supplied to the plurality of electrodes 110 through the switching unit 220.

The switching unit 220 including a plurality of switches applies the common voltage generated by the common voltage generating unit 210 or the touch scan signal generated by a touch sensing unit 320 of the touch IC 300 to the plurality of electrodes 110 and transmits the touch sensing signal according to the touch scan signal to the touch IC 300.

For example, the plurality of switches of the switching unit 220 may apply the common voltage generated by the common voltage generating unit 210 to the plurality of electrodes 110 simultaneously when the panel 100 is operated in the display driving mode. The plurality of switches of the switching unit 220 may apply the touch scan signal generated by the touch IC 300 to groups of the plurality of electrodes 110 sequentially when the panel 100 is operated in the touch driving mode.

In addition, the switching unit 220 may transmit the touch sensing signal according to the touch scan signal to the touch IC 300 by group. Although the electrode group is not shown in the display device according to an embodiment of the present invention, the electrode group may be the electrode column or a sum of the plurality of electrode columns.

The touch IC 300 is connected to the plurality of electrodes 110 through the switching unit 220 of the display drive IC 200. The touch IC 300 generates the touch scan signal and supplies the touch scan signal to the display drive IC 200. In addition, the touch IC 300 receives a plurality of touch sense signals according to the touch scan signal from the plurality of electrodes 110 and senses a touch using the plurality of touch sense signals.

For example, when the panel 100 is operated in the touch driving mode, a touch scan signal generating unit 310 of the touch IC 300 may generate the touch scan signal (not shown) for sensing the touch of the panel 100 and may supply the touch scan signal to the switching unit 220 of the display drive IC 200. The touch IC 300 may apply the touch scan signal to all of the plurality of electrodes 110 of the panel 100 using the switching unit 220. Alternatively, the touch IC 300 may apply the touch scan signal to the plurality of electrodes by group using the switching unit 220.

The touch scan signal may be a touch driving voltage, and a minimum of the touch driving voltage may be greater than the common voltage applied to the plurality of electrodes 110 of the panel 100 for display driving.

When the touch scan signal is applied to the plurality of electrodes 110 and a plurality of touch sensing signals are generated in the plurality of electrodes 110, the touch sensing unit 320 of the touch IC 300 receives the touch sensing signals through the switching unit 220 of the display drive IC 200 and senses a touch position by the user using based on a touch sensing signal indicative of a touch.

The touch sensing unit 320 senses the touch using a difference in capacitance of the touch sensing signal. The difference in capacitance of the touch sensing signal is obtained from two sensing signals of the adjacent two electrodes 110 through the adjacent two lines 120.

The plurality of contact holes 111 of the plurality of electrodes 110 may be symmetrically disposed in the adjacent electrode columns, or the plurality of lines 120 connected to the plurality of electrodes 110 may be symmetrically disposed in the adjacent electrode columns.

Hereinafter, a touch sensing method by a display device including an integrated touch panel according to an embodiment of the present invention will be described with reference to FIG. 3.

Figure 3:
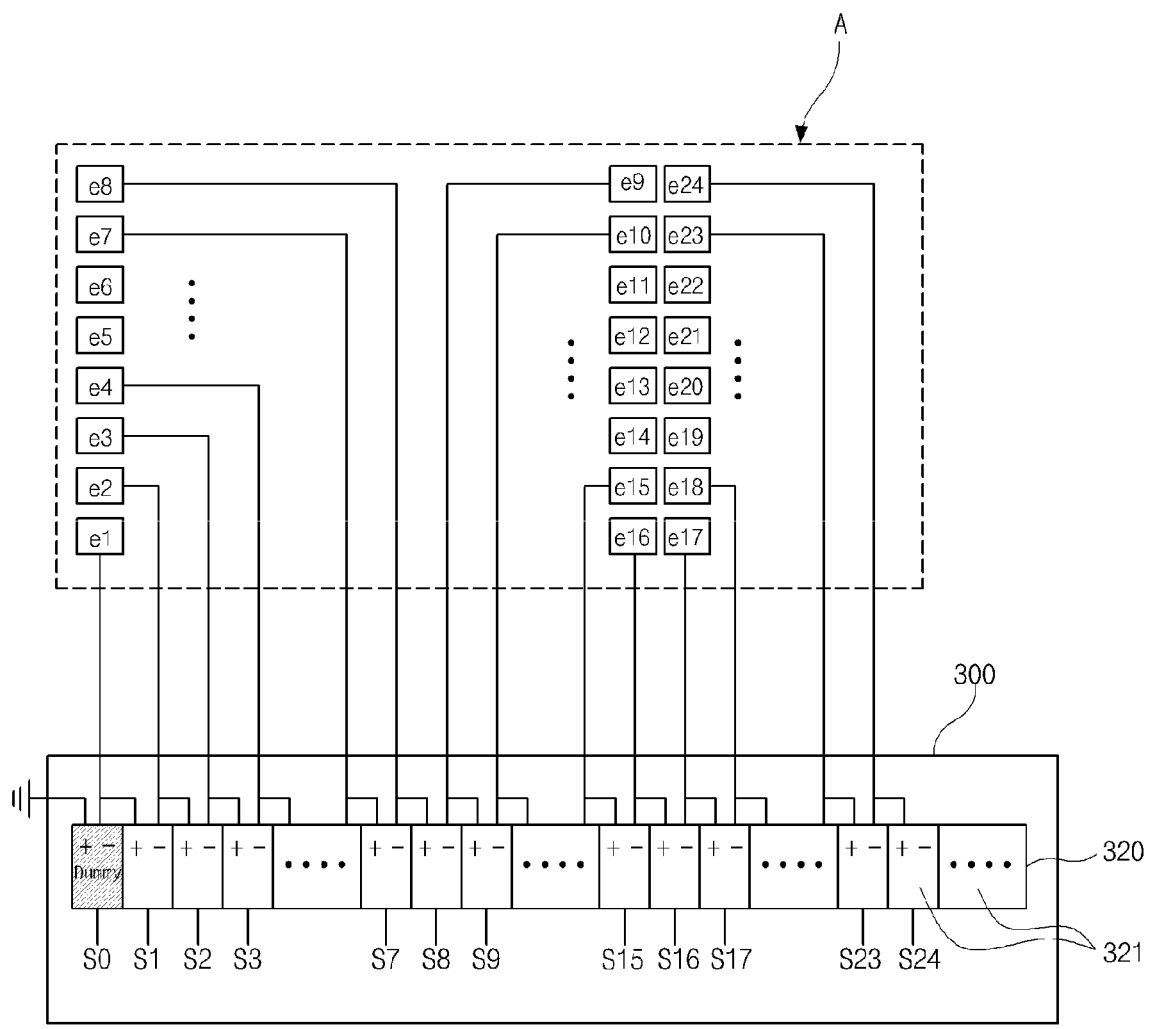
FIG. 3 illustrates a differential self sensing of a display device including an integrated touch panel according to one embodiment.

FIG. 3 is a view showing a differential self sensing of a display device including an integrated touch panel according to one embodiment. For convenience of illustration, electrodes e1 to e24 of a region A of FIG. 2 are shown and electrodes e25 to e48, a switching unit of a display driving IC and a touch scan signal generating unit of a touch IC are omitted in FIG. 3.

In FIG. 3, the touch sensing unit 320 includes a plurality of differential input VI (voltage to current) converters 321. Each of the electrodes e1 to e24 is connected to the adjacent pair of the plurality of differential input VI converters 321 of the touch sensing unit 320 of the touch IC 300. In addition, the adjacent pair of electrodes e1 to e24 shares each of the plurality of differential input VI converters 321 of the touch sensing unit 320 of the touch IC 300.

For example, the first electrode e1 may be connected to both a negative (−) terminal of the differential input VI converter 321 for outputting a zeroth scan data S0 and a positive (+) terminal of the differential input VI converter 321 for outputting a first scan data S1. The zeroth scan data S0 outputted from the dummy differential input VI converter 321 corresponds to a region where the touch is not generated and is not used for sensing the touch. The dummy differential input VI converter 321 is a virtual converter irrelevant to the touch electrode and a positive (+) terminal of the dummy differential input VI converter 321 is connected to a ground terminal GND such that the dummy differential input VI converter 321 has a discharged state.

In addition, the second electrode e2 may be connected to both a negative (−) terminal of the differential input VI converter 321 for outputting the first scan data S1 and a positive (+) terminal of the differential input VI converter 321 for outputting a second scan data S2. Similarly, the ninth electrode e9 may be connected to both a negative (−) terminal of the differential input VI converter 321 for outputting an eighth scan data S8 and a positive (+) terminal of the differential input VI converter 321 for outputting a ninth scan data S9, and the electrode e24 may be connected to both a negative (−) terminal of the differential input VI converter 321 for outputting a twenty-third scan data S23 and a positive (+) terminal of the differential input VI converter 321 for outputting a twenty-fourth scan data S24.

Since the display device including an integrated touch panel according to an embodiment of the present invention is driven by a touch sensing method using a differential self sensing unit (DSSU), the capacitance of the adjacent electrode is used for sensing a touch of the one electrode.

In the touch sensing method using the differential self sensing unit of the self-capacitive type display device, the difference between the capacitance of the one electrode where the touch input is generated and the capacitance of the adjacent electrode is measured using a differential structure and the touch input is sensed by accumulating the difference with delay. Since the touch noise is eliminated and the difference of capacitance is accumulated with delay through the differential structure, the small change in capacitance of the electrode is detected to improve touch sensitivity.

Since an overlapping area of the plurality of electrodes and the plurality of lines increases from electrode e1 to electrode e8 or from electrode e16 to electrode e9, the parasitic capacitance of the plurality of electrodes increases according to a distance of the plurality of electrodes from the display drive IC 200. For example, the parasitic capacitance of electrode e8 may have a difference of about 5 pF to about 10 pF as compared with the parasitic capacitance of each of electrode e1 and electrode e16. When the touch sensing method using the differential self sensing unit is applied to the difference of the relatively high parasitic capacitance of electrode e8 and the relatively low parasitic capacitance of electrode e16, the touch sensing may have error data. By applying the touch sensing method to two adjacent electrodes which have relatively similar parasitic capacitance due to the symmetrical line structure described above, the error data is minimized.

In the display device including an integrated touch panel according to an embodiment of the present invention, the plurality of contact holes on the plurality of electrodes are symmetrically disposed with in the adjacent electrode columns or the plurality of lines connected to the plurality of electrodes are symmetrically disposed in the adjacent electrode columns. Accordingly, the touch sensing of the differential self sensing type is performed by comparing the electrodes having the relatively high parasitic capacitances and by comparing the electrodes having the relatively low parasitic capacitances, thereby eliminating the error data.

In an in-cell type self-capacitive display device including an integrated touch panel according to an embodiment of the present invention, consequently, touch sensing accuracy and reliability of touch sensing using a differential self sensing unit (DSSU) are improved.

In addition, exact touch sensing is obtained even using an electrode which has a relatively high parasitic capacitance due to a long distance from a display drive IC.

Further, touch sensing is performed using electrodes having similar parasitic capacitances.

It will be apparent to those skilled in the art that various modifications and variations can be made in embodiments of the present invention without departing from the spirit or scope of the invention. Thus, it is intended that the present invention cover the modifications and variations of this invention provided they come within the scope of the appended claims and their equivalents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A display device comprising:
 a touch panel including a plurality of electrode columns, each electrode column including a plurality of electrodes positioned in the electrode column, the plurality of electrode columns including at least a first electrode column and a second electrode column that are adjacent to each other, the first electrode column and the second electrode column each including a first longitudinal edge and a second longitudinal edge where the second longitudinal edge of the first electrode column is adjacent to the first longitudinal edge of the second electrode column;
 a plurality of lines, each line connected to a corresponding electrode included in a corresponding one of the plurality of electrode columns;
 a display driving integrated circuit (IC) connected to the plurality of lines, the display driving IC for applying a touch scan signal to the plurality of electrodes of one or more electrode columns; and
 a touch IC for receiving a plurality of touch sense signals that are generated based on the touch scan signal from the plurality of electrodes;
 wherein lengths of the lines within the first electrode column increase as the lines within the first electrode column are positioned further from the first longitudinal edge of the first electrode column that is not adjacent to the first longitudinal edge of the second electrode column in a direction substantially perpendicular to a longitudinal direction of the lines of the first electrode column and towards the first longitudinal edge of the second electrode column;

wherein lengths of the lines within the second electrode column decrease as the lines within the second electrode column are positioned further from the first longitudinal edge of the second electrode column in a direction substantially perpendicular to a longitudinal direction of the lines of the second electrode column and towards the second longitudinal edge of the second electrode column;

wherein the touch IC determines a touch input based on the touch sense signals received from at least two adjacent electrodes in one of the electrode columns;

wherein a line with a longest length from the first electrode column is directly adjacent to a line with a longest length from the second electrode column to minimize a difference in capacitance between the line with the longest length from the first electrode column and the line with the longest length from the second electrode column.

2. The display device of claim 1, wherein each of the plurality of electrodes included in each electrode column is vertically arranged in the electrode column in a direction parallel to the plurality of lines connected to the electrode column and is vertically adjacent to at least one other electrode included in the electrode column.

3. The display device of claim 1, wherein within each of the plurality of electrode columns, the plurality of electrodes include a plurality of contact holes.

4. The display device of claim 3, wherein each of the plurality of electrodes within one of the electrode columns includes a contact hole that is horizontally positioned in the electrode at a substantially equal horizontal distance from a position of a contact hole included in at least one other electrode that is vertically adjacent to the electrode.

5. The display device of claim 3, wherein within each of the plurality of electrode columns, each of the plurality of lines is connected to an electrode via a contact hole included in the electrode.

6. The display device of claim 1, wherein the plurality of electrodes further include a third electrode column that is adjacent to the second electrode column and the third electrode column including a first longitudinal edge and a second longitudinal edge, the first longitudinal edge of the third electrode column adjacent to the second longitudinal edge of the second electrode column, and wherein lengths of lines within the third electrode column increase as the lines within the third electrode column are positioned further from the first longitudinal edge of the third electrode column in a direction substantially perpendicular to a longitudinal direction of the lines of the third electrode column.

7. The device of claim 1, wherein each of the plurality of electrodes of at least one of the electrode columns includes multiple contact holes.

8. The device of claim 1, wherein the plurality of electrode columns are disposed along a direction parallel to the plurality of lines.

* * * * *